US006843618B2

(12) United States Patent
Lundy

(10) Patent No.: US 6,843,618 B2
(45) Date of Patent: Jan. 18, 2005

(54) IN SITU SUBSURFACE DECONTAMINATION METHOD

(76) Inventor: William L. Lundy, 6412 Elm La., Oak Forest, IL (US) 60452

(*) Notice: Subject to any disclaimer, the term of this patent is extended or adjusted under 35 U.S.C. 154(b) by 55 days.

(21) Appl. No.: 10/023,465

(22) Filed: Dec. 14, 2001

(65) Prior Publication Data

US 2002/0110509 A1 Aug. 15, 2002

Related U.S. Application Data

(60) Provisional application No. 60/256,534, filed on Dec. 18, 2000.

(51) Int. Cl.$^7$ .................................................. B09B 1/00

(52) U.S. Cl. ............................ 405/128.75; 405/128.5; 588/205; 210/747

(58) Field of Search ..................... 405/128.1, 128.75, 405/128.5; 588/205; 210/747, 758, 763

(56) References Cited

U.S. PATENT DOCUMENTS

| | | | | |
|---|---|---|---|---|
| 4,294,703 A | | 10/1981 | Wilms et al. ................ 210/631 |
| 4,321,143 A | | 3/1982 | Wilms et al. ................ 210/631 |
| 4,370,241 A | | 1/1983 | Junkermann et al. ........ 210/759 |
| 4,588,506 A | * | 5/1986 | Raymond et al. ........... 210/606 |
| 4,591,443 A | | 5/1986 | Brown et al. ................ 210/747 |
| 4,604,214 A | | 8/1986 | Carr et al. ................... 210/759 |
| 4,724,084 A | | 2/1988 | Pahmeier et al. ........... 210/709 |
| 4,804,480 A | | 2/1989 | Jayawant .................... 210/759 |
| 5,043,080 A | | 8/1991 | Cater et al. ................. 210/748 |
| 5,264,018 A | | 11/1993 | Koenigsberg ................. 71/63 |
| 5,266,214 A | | 11/1993 | Safarzedeh-Amiri ........ 210/748 |
| 5,286,141 A | | 2/1994 | Vigneri ........................ 405/128 |
| 5,395,419 A | | 3/1995 | Farone ........................... 71/63 |
| 5,520,483 A | | 5/1996 | Vigneri ....................... 405/128 |
| 5,525,008 A | | 6/1996 | Wilson ....................... 405/128 |
| 5,564,105 A | * | 10/1996 | Alvino et al. ................. 588/20 |
| 5,610,065 A | | 3/1997 | Kelley et al. ................ 435/264 |
| 5,611,642 A | | 3/1997 | Wilson ....................... 405/128 |
| 5,741,427 A | | 4/1998 | Watts et al. ................. 210/747 |
| 5,955,350 A | | 9/1999 | Soni et al. ................... 435/264 |
| 5,967,230 A | | 10/1999 | Cooper et al. .............. 166/245 |
| 6,160,194 A | * | 12/2000 | Pignatello .................... 588/205 |
| 6,210,078 B1 | * | 4/2001 | Redwine et al. ............ 405/263 |
| 6,268,205 B1 | | 7/2001 | Kiest et al. .................... 301/87 |
| 6,459,011 B1 | * | 10/2002 | Tarr et al. ................... 588/205 |

OTHER PUBLICATIONS

Barbeni et al.; "Chemical Degradation of Chlorophenols with Fenton's Reagent"; Chemosphere, vol. 16, pp. 2225–2237, 1987.

Bowers et al.; "Treatment of Toxic or Refractory Wastewaters with Hydrogen Peroxide"; Water Science & Technology, vol. 21, pp. 477–486, 1989.

Brown et al.; "Competition between chelating agents and roots as factors affecting absorption of iron and other ions by plant species;" Plant Physiology, vol. 35, pp. 878–886, 1960.

Gates et al.; "In Situ Chemical Orientation of Trichloroethylene Using Hydrogen Peroxide", Journal of Environmental Engineering, vol. 121, pp. 639–644, 1995.

Halvorson et al.; "Equilibrium Relationship of Metal Chelates in Hydroponic Solutions"; Soil Science Society America Journal; vol. 36, pp. 755–761, 1972.

Hill et al.; "Rates of Solution of Limestone Using the Chelating Properties of Versene (EDTA) Compounds"; Kansas State Geological Survey, Bulletin No. 165, Part 7, 1963.

Hill et al.; "Solubility of Twenty Minerals in Selected Versene (EDTA) Solutions"; Kansas Stats Geological Survey, Bulletin No. 175, Part 3, 1965.

Kim et al.; "Enhancing Biological Treatability of Landfill Leachate by Chemical Oxidation", Environmental Engineering Science, vol. 14, pp. 73–79, 1997.

Lindsay et al.; "Development of a DTPA Soil Test for Zn, Fe, Mn and Cu"; Soil Science Society America Journal; vol. 42, pp. 421–428, 1978.

Lindsay; "Chemical Equilibria in Soils"; chap. 15, 449 p., John Wiley & Sons, 1979.

Lipcynshka–Kocharry et al.; "Influence of some Groundwater and Surface Water Constituents on the Degradation of 4–Chlorophenol by the Fenton Reaction"; Chemosphere, vol. 30, pp. 9–20, 1995.

Norvell et al. "Reactions of EDTA Complexes of Fe, Zn, Mn and Cu with Soils"; Soil Science Society America Proceedings, vol. 33, pp. 86–91, 1969.

Norvell et al.; "Reactions of DTPA Chelates of Fe, Zn, Cu and Mn with Soils", Soil Science Society America Proceedings, vol. 36, pp. 778–783, 1972.

Pignatello et al.; "Ferric Complexes as Catalysts for "Fenton" Degradation of 2,4–D and Metolachlor in Soil", Journal of Environmental Quality, vol. 23, pp. 365–370, 1994.

Pradhan et al.; "Pilot–Scale Bioremediation of PAH–Contaminated Soils"; Applied Biochemistry and Biotechnology, vol. 63–65, pp. 759–773, 1997.

(List continued on next page.)

Primary Examiner—John Kreck
(74) Attorney, Agent, or Firm—Robert F. Kemp; John G. Premo

(57) ABSTRACT

A method of decontaminating soil and ground water containing organic contaminants and divalent metal compounds. It comprises the steps of first treating such soils and ground water with an effective amount an aqueous solution containing a peroxide and a water soluble chelating agent for a time sufficient to have the water soluble chelating agent chelate at least one of the divalent metals of the divalent metal compounds present in the soil and ground water. Next, the chelated metals are brought into contact with the peroxide to catalytically convert the peroxide to an oxidizing agent. Finally, the last step is contacting the organic contaminants in the soil and ground water with the oxidizing agent to oxidize the organic contaminants to environmentally safe, non-toxic compounds.

6 Claims, No Drawings

OTHER PUBLICATIONS

Ravikumar et al.; "Chemical Oxidation of Clorinated Organics by Hydrogen Peroxide in the Presence of Sand"; Environmental Science & Technology, vol. 28, 394–400, 1994.

Rush et al.; "The Reaction between Ferrous Polyaminocarboxylate Complexes and Hydrogen Peroxide: An Investigation of the Reaction Intermediates by Stopped Flow Spectrophotometry"; Journal of Inorganic Biochemistry; vol. 29, pp. 199–215; 1987.

Rush et al.; "Distinction between Hydroxyl Radical and Ferryl Species"; Methods in Enzymology, vol. 86, pp. 148–156, 1990.

Schirmann et al.; "Hydrogen Peroxide in Organic Chemistry"; chap. 5, 211 p., Edition Et Documentation Industrielle, 1979.

Schumb et al.; "Hydrogen Peroxide"; chaps 8 & 9, 759 p., American Chemical Society Monograph Series, 1955.

Sedlak et al.; "Oxidation of Chlorobenzene with Fenton's Reagent"; Environmental Science & Technology, vol. 25, pp. 777–782, 1991.

Sparks, "Soil Physical Chemistry"; chap. 4, 409 p., CRC Press, 1999.

Sposito; "The Chemistry of Soils"; chaps. 4 & 5, 277 p., Oxford University Press, 1989.

Stumm et al.; "Aquatic Chemistry, An Introduction Emphasizing Chemical Equilibria in Natural Waters"; Chap. 6, 583 p., John Wiley & Sons, 1970.

Stumm et al.; "Aquatic Chemistry, Chemical Equilibria and Rates in Natural Waters"; chap. 7, 1022 p., John Wiley & Sons, 1996.

Tyre et al.; "Treatment of Four Biorefractory Contaminants in Soils Using Catalyzed Hydrogen Peroxide"; Journal of Environmental Quality, vol. 20, pp. 832–838, 1991.

Voelker et al.; "Effects of Fulvic Acid on Fe(II) Oxidation by Hydrogen Peroxide"; Environmental Science & Technology, vol. 30, pp. 1106–1114, 1996.

Waite et al.; "Kinetics and Stoichiometry of Oxygen Relese from Solid Peroxides"; Environmental Engineering Science, vol. 16, pp. 187–199, 1999.

Walling; "Fenton's Reagent Revisited"; Accounts of Chemical Research, vol. 8, pp. 125–131, 1975.

Walling et al.; "Fenton Reagent, V. Hydroxylation and Side–Chain Cleavage of Aromatics"; Journal of the American Chemical Society, vol. 97, pp. 363–367, 1975.

Walling et al.; "The Oxidation of Mandelic Acid by Fenton's Reagent"; Journal of the American Chemical Society, vol. 104, pp. 1185–1189, 1982.

Watts et al.; "Treatment of Pentachlorophenol Contaminated Soils using Fenton's Reagent"; Hazardous Waste Hazardous Materials, vol. 7, pp. 335–345, 1990.

Watts et al.; "Treatment of Octachlorodibenzo–p–dioxan (OCDD) in Surface Soils Using Catalyzed Hydrogen Peroxide"; Chemosphere, vol. 23, pp. 949–956, 1991.

Watts et al.; "Hydrogen of Peroxide for Physico–Chemically Degrading Petroleum–Contaminated Soils"; Remediation, vol. 2, pp. 413–425, 1992.

* cited by examiner

IN SITU SUBSURFACE DECONTAMINATION METHOD

RELATED APPLICATIONS

Priority is claimed from Provisional Application Serial No.: 60/256,534, filed Dec. 18, 2000, for "In Situ Subsurface Decontamination Method."

BACKGROUND OF THE INVENTION

1. Field of the Invention

The present invention relates to the chemical decontamination of contaminants in soil and groundwater in an in situ environment using oxidizing agents.

2. Description of the Prior Art

Conventional in situ treatment technologies for cleaning contaminated subsurface media use injection ports or a combination of injection and extraction ports to deliver reagents and to extract reaction byproducts and contaminants. In situ chemical oxidation requires the delivery of oxidizing reagents in an aqueous medium. Following gravitation, the aqueous reagent solution administered to the subsurface through fixed injection ports becomes an integral part of the groundwater. The volume of contaminated subsurface media in the unsaturated zone above the groundwater table that is affected by the reagent solution is limited to the annular space of the injection ports. Within the groundwater, the reagent solution follows the natural or induced hydraulic gradient. The oxidizing and hydrophilic reagent solution follows preferred pathways, due to physical and chemical heterogeneities of subsurface media. Physical heterogeneities include variability in hydraulic conductivity caused by material changes for example clay versus sand versus gravel soils versus fractured bedrock. Mineral surfaces are hydrophilic. The hydrophilic properties are altered by sorption of organic compounds such as natural soil organic matter and organic contaminants that contain hydrophobic moieties.

The physical limitations of conventional in situ delivery systems, injection wells, and the physical chemical heterogeneities of subsurface media, limit the effectiveness of oxidizing reagent solutions in making contact with contaminants. Moreover, the oxidizing reagents that are typically utilized in in situ chemical oxidation systems, e.g. liquid hydrogen peroxide, permanganate, etc., are unstable and/or short-lived.

Consumption of oxidant by matrix constituents typically exceeds the oxidant consumption by contaminants. To overcome these limitations, large volumes of highly concentrated reagent solutions are typically administered to the contaminated subsurface media. The introduction of highly concentrated and reactive solutions that contain non-specific oxidizing agents poses problems with respect to controlling the progress and the heat of these reactions.

In situ oxidation systems are known that chemically oxidize organic contaminants to environmentally safe and non-toxic constituents. One such system is a reaction named after its discoverer, H. J. H. Fenton (1894). In this reaction, the oxidizing agent, hydrogen peroxide, is reacted with a metallic salt to generate free radicals with a higher oxidation potential than hydrogen peroxide. The free radicals react with organic compounds to either completely decompose them to carbon dioxide and water or to convert them to water soluble and biologically degradable compounds. A drawback to this process is that the catalytic decomposition of hydrogen peroxide and oxidation of organic compounds by radicals are both exothermic reactions.

A number of patents teach the art of treating contaminants with Fenton-type chemical systems in in situ environments. The patents by Brown et al., U.S. Pat. No. 4,591,443, Vigneri, U.S. Pat. No. 5,520,483, Wilson, U.S. Pat. No. 5,611,642, Kelly et al., U.S. Pat. No. 5,610,065, and Cooper et al., U.S. Pat. No. 5,967,230, teach the introduction of liquid hydrogen peroxide and a metal catalyst, Fenton's Reagent, such as an iron salt, into the subsurface. Watts et at., U.S. Pat. No. 5,741,427, teaches the injection of a chelated metal catalyst for use in an in situ chemical oxidation. All of the above cited art adds a metal catalyst into the subsurface. In addition, the processes described in the above cited art include either the co-injection or the sequential introduction of reagents, where the oxidizing agent is added either before or after the metal catalyst. Finally, all of the prior art teaches the necessity of introducing both the oxidizer and the metal catalyst separately into the subsurface to facilitate the oxidation of contaminants.

It would be of benefit to the art if the use of metal catalyzed peroxides to oxide underground contaminants could be improved whereby it could be simplified, be more controllable, and would produce good results without large amounts of exothermic heat being generated.

OBJECTS OF THE INVENTION

The main object of the invention is to provide an improved method for the in situ decontamination of subsurface media contaminated with organic compounds.

A primary object is to use only one aqueous reagent fluid that contains all the reagents required for the oxidation of the underground contaminants being treated.

Another important object of the invention is for the one aqueous reagent fluid, when added to the subsurface to extract naturally occurring metals, to have catalytic activity in the generation of oxidizing agents from peroxides.

A further valuable advantage of the invention is to control the rate of the above-described reactions. Other objects will be disclosed hereafter and also will become apparent to those skilled in this art.

SUMMARY OF THE INVENTION

The invention comprises an improved method of decontaminating soil and ground water containing organic contaminants and divalent metal compounds. It comprises the steps of:

(a) first treating such soils and ground waters with an with an effective amount an aqueous solution containing a peroxide and a water-soluble chelating agent for a time sufficient to have the water-soluble chelating agent chelate at least one of the divalent metals of the divalent metal compounds present in the soil and ground water;

(b) next, the chelated metals are reacted with the peroxide to catalytically convert the peroxide to an oxidizing agent; and, (c) finally, contacting the organic contaminants in the soil and ground water with the oxidizing agent to oxidize the organic contaminants to environmentally safe, non-toxic compounds.

The term, "aqueous solution" as used herein and in the claims includes aqueous finely divided suspensions and slurries.

In preferred embodiments, the water-soluble chelating agent is an aminopolycarboxylate-chelating agent, desirably, an alkylenepolyamine polyarboxylate chelating agent. Useful chelating agents of this type are compounds such as ethylienediaminetetraacetic acid (EDTA), diethylenetri-aminepentaacetic acid (DTPA) and ethylenedianvnc-di(o-hydroxyphenylacetic acid) (EDDHA). These compounds can be used alone or in combination, which latter option is a preferred species of the chelates. A combination that gives good results is a blend of ethylienediaminetetraacetic acid with diethylenetriaminepentaacetic acid. These compounds have greater solubility in the form of their alkali metal or ammonia salts. The amount of chelating used typically is within the range of from about 0.03 to about 1.5 Moles/Liter.

The divalent metal compound preferably is iron. Iron is almost universally present in nearly all soils and ground waters. The chelated iron is effective in the practice of the invention in either of its valency states, including mixtures thereof. Other catalytically active metal compounds, such as those of copper, if present in the soil, produce satisfactory results. It is, of course, understood that the divalent compound present in the soil or groundwater must by capable of catalyzing the reactions described in its chelated form.

The peroxide is present in the aqueous solution in an amount ranging from about 0.6 to about 4.5 Moles/Liter. The pH of the solution of peroxide and chelating agent should be or should be adjusted to at least 7.0. A beneficial range is pHs between 7.0 and 9.5. The peroxides preferably used are metal peroxides and blends thereof, although hydrogen peroxide may be employed.

The aqueous solution of the peroxide and a water-soluble chelating agent, when adjusted to achieve the pH levels described, most often requires the presence of an alkaline buffering agent. Preferred alkaline buffering agents are alkaline phosphate salts and urea phosphate.

In the above-described steps and their preferred embodiments, the aqueous solutions are injected into at least one location, preferably multiple locations. Blends of chelating agents and peroxides may be used as well as single compounds of these groups of compounds.

DETAILED DESCRIPTION OF THE INVENTION

The method involves an oxidation reaction whereby organic contaminants are chemically oxidized by reaction with hydrogen peroxide and metallic peroxides in the presence of a metal catalyst. The method includes harnessing the abundance of metals in soil and bedrock as source of the metal catalysts. The method may involve at least one, preferably, a plurality, of injection sites, whereby a single aqueous reagent fluid is injected into the subsurface to facilitate the oxidation of contaminants. The in situ subsurface media affected by the method of this invention includes the subsurface unsaturated zone, the capillary fringe above the groundwater table, and the water-saturated zone, including soil and groundwater in fractured bedrock.

In one embodiment of the invention, an aqueous oxidizing reagent formulation is delivered to an in situ subsurface media, soil and groundwater, contaminated with organic compounds. The formulation is comprised of liquid and solid peroxides, phosphate salts, as well as sulfuric acid and its salts and aminopolycarboxylate chelates. The chelates in the reagent fluid extract naturally occurring metals from soil and bedrock as a source of metal catalysts necessary to convert the peroxides to the oxidizing agents that ultimately convert the contaminants to environmentally safe and nontoxic compounds. The methodology of successfully compounding chelating agents into the oxidizer reagent formulation obviates the need for a second formulation containing the metal catalysts. Because the method controls the activity of the chelates and the oxidizers, the rate of the oxidation reaction is controlled, thereby minimizing or eliminating the temperature rise produced by the current technologies. Also, the method minimizes any increase in the temperature of the groundwater and/or soil moisture, and the volatilization of contaminants in the in situ proximity of the oxidation reaction is also minimized.

The contaminants converted by the chemical process include, inter alia, aliphatic hydrocarbons, such as gasoline, diesel fuel, olefinic hydrocarbons, chlorinated and polychlorinated hydrocarbons, dry cleaning and industrial solvents, wood treating agents, herbicides, pesticides, polychlorinated bipbenyls, and aromatic and polynucleararomatic hydrocarbons, oxygenated hydrocarbons, phenol and phenol derivatives, nitrogenous hydrocarbons, or mixtures thereof.

The peroxides that are administered to the subsurface media in an aqueous fluid include the peroxides, hydrogen peroxide, magnesium peroxide, calcium peroxide, and sodium percarbonate. The buffering agent that is desirably a water-soluble phosphate may be selected from the alkali metal phosphates, potassium phosphate being exemplary, ammonium phosphate, urea phosphate, and combinations thereof. As stated above, the preferred chelates are exemplified by the aminopolycarboxylate chelates ethylenediaminetetraacetic acid (EDTA), diethylenetriaminepentaacetic acid (DTPA), ethylenediamine-di(o-hydroxyphenylacetic acid) (EDDHA), their salts and combinations thereof.

Phosphates as well as sulfuric acid and its salts are used to adjust the pH and to inhibit decomposition of hydrogen peroxide by free iron or other divalent metals, such as copper in the aqueous reagent fluid.

The method utilizes the hydrogen peroxide liberated by the dissolution of solid peroxides includes calcium peroxide, magnesium peroxide, and sodium percarbonate. The preferred solid calcium and magnesium peroxide employed in this invention react with water according to the following reactions:

CaO2+2H2O Ca(OH)2+H2O2                (1)

MgO2+2H2O Mg(OH)2+H2O2                (2)

Ca(OH)2 Ca2+2OH—                       (3)

Mg(OH)2 Mg2+2OH—                       (4)

The hydrogen peroxide that is gradually liberated in reactions (1) and (2) is available for catalytic decomposition. The hydroxides resulting from reactions (1) and (2) dissociate reactions (3) and (4), thereby raising the pH of the solution The phosphates added to the solution moderate the pH drift. The pH drifts to basic conditions. Basic pHs facilitates the dissolution of suspended EDTA, DTPA, and EDDHA solids.

The Chelating Agents

The synthetic chelating agents employed in the present invention are the aminopolycarboxylatechelates EDTA, DTPA, and EDDHA. These agents form soluble complexes and chelates with free metal ions, such as divalent iron Fe(II), trivalent iron Fe(III), divalent copper Cu (II), divalent zinc Zn(II), divalent magnesium (Mg(II) and divalent calcium Ca(II) in solution. The chelating agents dissociate exchangeable cations attached to mineral surfaces and also dissolve minerals. The iron-containing minerals that are dissolved by chelates include, inter alia, goethite, hematite, magnetite, ferrihydrite, and siderite.

The effective complexation of the iron catalyst is strongly dependent on solution pH and the presence of Ca(II) and, to a lesser degree, Mg(II) (water hardness), which typically occurs at higher concentrations than Fe in natural waters. The proportions of EDTA, DTPA, and EDDHA employed depend upon the water hardness and the leachability of Ca(II), Mg(II), and Fe(II)/Fe(III) from soils and bedrock. Two solution conditions are known to decrease the stability of Fe-EDTA and Fe-DTPA, i.e., their tendency to form soluble Fe-chelates. In basic solutions, the solubility of iron is controlled by amorphous ferric iron hydroxide, which precipitates and diminishes the stability of Fe-EDTA and Fe-DTPA complexes. Calcium at high solution concentrations competes with iron for chelates Fe-DTPA, and more so, Fe-EDDHA chelates are less affected by these solution conditions than Fe-EDTA chelates.

The present invention utilizes an oxidation reaction, where a chelated metal, preferably chelated iron, catalyzes the decomposition of hydrogen peroxide to yield hydroxyl, perhydroxyl, and superoxide radicals. As such, the reagent fluid should contain only an effective amount of metal catalyst i.e., not an excessive amount of catalyst to cause an undesirable detectable increase in the decomposition rate of the peroxide for safety and stability reasons. The soluble Fe-EDTA, Fe-DTPA, and Fe-EDDHA chelates react with hydrogen peroxide to yield these highly reactive radicals, which, in turn, react with organic compounds. The rate of oxidation reaction with Fe(II)-aminocarboxylate complexes, including Fe(II)-EDTA, Fe(II)-DTPA, and Fe(II)-EDDHA complexes is greater by orders of magnitude than the rate of oxidation reaction with Fe-aquo complexes in solutions with near neutral pH. Fe(II) and Fe(III)-chelates are part of a cycle that decomposes hydrogen peroxide. Hydrogen peroxide oxidizes Fe(II)-chelate to Fe(III)-chelate and reduces Fe(III)-chelate to Fe(II)-chelate. The radicals that evolve from these oxidation and reduction reactions also oxidize the organic complexing agents.

In aqueous Fenton-type oxidation systems, aliphatic and aromatic compounds and their halogenated derivatives undergo hydroxylation followed by mineralization. Fenton-type oxidation systems have been used to enhance the biological treatability of wastewater and landfill leachate containing various toxic and recalcitrant organic compounds. Fenton-type oxidation systems in soil decompose organic contaminants and also enhance their biological degradation in soil.

Solution Concentration And Application To Soil And Ground Waters

In a preferred embodiment of the invention, the reagent fluid is comprised of water, the peroxides hydrogen peroxide, and/or calcium peroxide, magnesium peroxide and sodium percarbonate, preferably, calcium peroxide, magnesium peroxide and/or sodium percarbonate; and the salts of potassium phosphate salts and urea phosphate, and combinations thereof of the aminopolycarboxylate chelates ethylenediaminetetraacetic acid (EDTA), diethylenetriaminepentaacetic acid (DTPA), ethylenediamine-di(o-hydroxyphenylacetic acid) (EDDHA), and their salts and combinations thereof, and are injected into soil and groundwater. The proportions of aminopolycarboxylate chelates are determined based on site-specific leachability of calcium, iron, and copper naturally occurring in the soil and bedrock, groundwater alkalinity, and soil pH. The concentration of total aminopolycarboxylate chelate employed typically ranges from about 0.03 Moles/Liter to about 0.25 Moles/Liter of reagent fluid, although more or less may be used for more extreme subsurface media conditions. The potential maximum molar concentration of hydrogen peroxide evolving from the dissolution of peroxide mixtures employed ranges from 0.6 Moles/Liter to 4.5 Moles/Liter of reagent fluid. The proportion of phosphate salts is contingent on site-specific pH of the groundwater and/or the buffering capacity of the soil.

The method of this embodiment injects a single reagent fluid that contains all of the reagent compounds required for chemical oxidation of contaminants. At least one injection, preferably, a plurality of closely spaced injections, is performed within the contaminated subsurface media to increase the probability of contact between the reagent and the contaminant. The in situ environment wherein the fluid is administered includes, separately or in combination, soil in the groundwater unsaturated zone, the capillary fringe, soil and groundwater of the water saturated subsurface, and groundwater in the bedrock The preferred embodiment treats subsets of the entire contaminated volume by administering small volumes of reagent fluid in a plurality of injection points. This application methodology allows the treatment of subsets with fluid volumes sufficient to wet the media.

The rate of the oxidation reactions is controlled by two mechanisms. Because of the gradual dissolution of solid peroxides, the concentration of hydrogen peroxide in the subsurface media remains sufficiently low. The dissolution of the peroxides increases the pH, which, in turn, leads to the dissolution of the acidic chelates required for the formation of the chelated iron catalyst. The combined effect of the two mechanisms minimizes or eliminates the evolution of excessive heat from oxidation reactions. As such, the temperature of the ground water/subsurface media typically rises no more than 10° F., preferably no more than 5° F., most preferably, no more than 1° F. The oxidation reactions cause mild of gassing of carbon dioxide and oxygen. The off gassing observed during progressive injections is utilized to delineate the vertical and horizontal extent of contamination in subsurface media and to make adjustments to the reagent fluid.

EXAMPLES

Example 1

A field study was undertaken at a landfill site where the groundwater was contaminated with chlorinated volatile organic compounds VOCs. The study site was delineated to include an area measuring 25 feet by 25 feet, centered on a monitoring well screened from 8 to 18 feet below grade level (bgl). Groundwater elevation at the time of the study was 8.6 feet bgl. The soil consisted of fine to coarse sand used as backfill material. The treatment included delivering 85 gallons of oxidizing reagent into each of 21 injection points spaced at a 5-foot matrix. The reagent was evenly distributed over a vertical interval, from 6 to 20 feet bgl, with the aid of a direct push probe. The reagent fluid consisted of the following groups of reagents:

(a) The oxidizing agents calcium peroxide and sodium percarbonate with potential maximum hydrogen peroxide evolution of about 2.2 Moles/Liter of reagent fluid.

(b) Acidic aminopolycarboxylate chelates and their salts, at a total chelate concentration of about 0.07 Moles/Liter of reagent fluid.

(c) Urea phosphate was added in amounts sufficient to adjust the hydrogen acidity to pH 8.

Immediately prior to the injection activities, a groundwater sample was collected and analyzed for contaminant levels. The groundwater temperature in the monitoring well was 51° F. prior to injection, with no change noted during or immediately following the injection activities. Thirty days subsequent to the injections, an additional groundwater sample was collected and analyzed of contaminant concentrations. A 93 percent reduction was observed in the concentration of Trichloroethene with cis-1,2 dichloroethene (cis-1,2 DCE), trans-1,2 dichloroethene (trans-1,2 DCE), and vinyl chloride reduced to below detection levels. The results are shown in Table 1.

TABLE 1

| Contaminant | Prior Injection* | Post Injection | % Reduction |
| --- | --- | --- | --- |
| Cis-1,2 DCE | 4,600 | <40 | 100 |
| Trans-1,2 DCE | 280 | <40 | 100 |
| Trichloroethene | 1,600 | 120 | 93 |
| Vinyl Chloride | 42 | <0.17 | 100 |

*micrograms per Liter

Example 2

A field study was undertaken at a service station site where the groundwater was contaminated with benzene, toluene, ethylbenzene, xylene (BTEX), and methyl tertiary-butyl ether (MTBE). The study site was delineated to include an area measuring 20 feet by 20 feet, centered on a monitoring well screened from 7 to 12 feet (limestone bedrock) below grade level (bgl). Groundwater elevation at the time of the study was 7 feet bgl. The soil consisted of brown silty clay. The treatment included delivering 23 gallons of oxidizing reagent into each of 33 injection points, spaced at a 3.5-foot matrix. The reagent was evenly distributed over a vertical interval from 2 to 12 feet bgl, with the aid of a high velocity fluid hydraulic drilling lance. The reagent fluid consisted of the following groups of reagents:

(a) The oxidizing agents calcium peroxide, magnesium peroxide and hydrogen peroxide, with potential maximum hydrogen peroxide evolution of about 3.1 Moles/Liter of reagent fluid.

(b) Acidic aminopolycarboxylate chelates and their salts at a total chelate concentration of about 0.07 Moles/Liter of reagent fluid.

(c) Urea phosphate was added in amounts sufficient to adjust the hydrogen acidity to pH 8.5.

Immediately prior to the injection activities, a groundwater sample was collected and analyzed for contaminant levels. The groundwater temperature in the monitoring well was 50° F. prior to injection, with only a one-degree increase observed during or immediately following the injection activities. Thirty days subsequent to the injections, an additional groundwater sample was collected and analyzed for contaminant concentrations. A 97 percent reduction was observed in the concentration of the BTEX contaminants and a 74 percent reduction in MTBE. The results of the application are shown in Table 2.

TABLE 2

| Contaminant | Prior Injection* | Post Injection | % Reduction |
| --- | --- | --- | --- |
| Benzene | 6.8 | .23 | 97 |
| Toluene | 1.00 | .01 | 299 |
| Ethylbenzene | 1.60 | .043 | 97 |
| Xylenes | 2.46 | 0.110 | 94 |
| BTEX | 11.86 | 0.395 | 97 |
| MTBE | 0.450 | 0.127 | 4 |

*milligrams per Liter

Example 3

A field application was undertaken at a railroad yard site where the soil was contaminated with diesel fuel. The contaminants of concern were polynuclear aromatic hydrocarbons (PNAs). The injection zone was delineated to include an area measuring 30 feet by 90 feet, centered on a railroad track section where the release had occurred. The soil consisted of a class 5-road bed mix overlain with crushed granite track bed material. The treatment included delivering 9 gallons of oxidizing reagent into each of 300 injection points spaced at a 3-foot matrix. The reagent was evenly distributed over a vertical interval from 0 to 4 feet bgl with the aid of a high velocity fluid hydraulic drilling lance. The reagent fluid consisted of the following groups of reagents:

(a) The oxidizing agents calcium peroxide and hydrogen peroxide, with potential maximum hydrogen peroxide evolution of about 2.8 Moles/Liter of reagent fluid.

(b) Acidic aminopolycarboxylate chelates and their salts at a total chelate concentration of about 0.07 Moles/Liter of reagent fluid.

(c) Urea phosphate was added in amounts sufficient to adjust the hydrogen acidity to pH 9.5.

Sixty days prior to the injection activities, soil samples were collected and analyzed for contaminant levels. Observations of off gassing of the oxidizer reacting with the contaminant aided in determining the vertical and horizontal extent of the contamination in soil. Thirty days subsequent to the injections, additional soil samples were collected and analyzed for contaminant concentrations. With the exception of pyrene and fluoranthene concentrations in sampling point TP-1, the contaminant concentrations in all other sampling points were shown to be below detection limits. The results of the application are shown in Table 3.

TABLE 3

| Sampling Point Contaminant | TP-1 B/A* | TP-2 B/A | TP-3 B/A | TP-4 B/A | TP-5 B/A |
| --- | --- | --- | --- | --- | --- |
| Fluoranthene | 9.5/0.0041** | 3.3/<.0037 | .6/<.0035 | .4/<.0033 | .4/<.003 |
| Pyrene | 12.0/.0034 | 4.4/<.0024 | .0/<.0027 | .7/<.0024 | .7/<.002 |
| Benzo(a)anthracene | 4.4/<.0021 | .8/<.0022 | .1/<.0022 | .3/<.0021 | .2/<.002 |
| Crysene | 5.2/<.0041 | .9/<.0042 | .0/<.0042 | .5/<.0041 | .3/<.004 |
| Benzo(b)fluoranthene | 4.5/<.0042 | .6/<.0043 | .5/<.0042 | .9/<.0041 | .5/<.004 |
| Benzo(a)pyrene | 5.0/>.0082 | .6/<.0083 | .9/<.0083 | .0/<.0081 | .8/<.008 |

*Contaminant concentrations before and after treatment
**Units expressed in milligram per kilogram Advantages of the Invention The invention has a number of advantages over the prior art. It does not require long-term operation, maintenance, and monitoring. The method utilizes a single reagent fluid instead of the multiple reagent fluids consistent with other current technologies. It greatly increases the ability of the reagents to penetrate the media and contact the contaminant by controlling the rate at which the reagent generates the oxidizing component. Further, it greatly increases the safety of the technology by the application of a dilute aqueous reagent fluid. The method provides the ability to control the rate of the chemical reactions during treatment, thereby minimizing or eliminating the heat generated by conventional technologies, and thus assuring that contaminants are not volatilized during the treatment. The method also eliminates the need for pretreatment of the subsurface media with acid and/or a metal catalyst as is required by the current technology.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method of decontaminating soil and ground water containing organic contaminants and an iron compound, which comprises the steps of:

treating such soils and ground water with an effective amount an alkaline aqueous solution which has a pH of at least 7 and contains an alkaline buffering agent, a peroxide and a water-soluble aminopolycarboxylate-chelating agent for a time sufficient to have the water-soluble aminopolycarboxylate-chelating agent chelate the iron of the iron compound present in the soils and ground water;

reacting the chelated iron with the peroxide to catalytically convert the peroxide to an oxidizing agent; and then, contacting the organic contaminants in the soil and ground water with the oxidizing agent to oxidize the organic contaminants to environmentally safe, non-toxic compounds.

2. The method of claim 1 where the alkaline buffering agent is an alkaline phosphate and urea phosphate.

3. The method of claim 1 where the pH of the alkaline aqueous solution is between 7.0 and 9.5.

4. The method of claim 1, where the water-soluble aminopolycarboxylate-chelating agent is an alkylenepolyamine polyarboxylate chelating agent.

5. A method of decontaminating soil and ground water containing organic contaminants and an iron compound, which comprises the steps of:

treating such soils and ground water with an effective amount an alkaline solution which has a pH between 7.0 and 9.5 and contains a phosphate and urea phosphate buffering agent, a peroxide and a water soluble aminocarboxylate-chelating agent for a time sufficient to have the water-soluble aminopolycarboxylate-chelating agent chelate the iron of the iron compound present in the soils and ground water;

reacting the chelated iron with the peroxide to catalytically convert the peroxide to an oxidizing agent; and then, contacting the organic contaminants in the soil and ground water with the oxidizing agent to oxidize the organic contaminants to environmentally safe, non-toxic compounds.

6. The method of claim 5, where the water-soluble aminopolycarboxylate-chelating agent is an alkylenepolyamine polyarboxylate chelating agent.

* * * * *